…

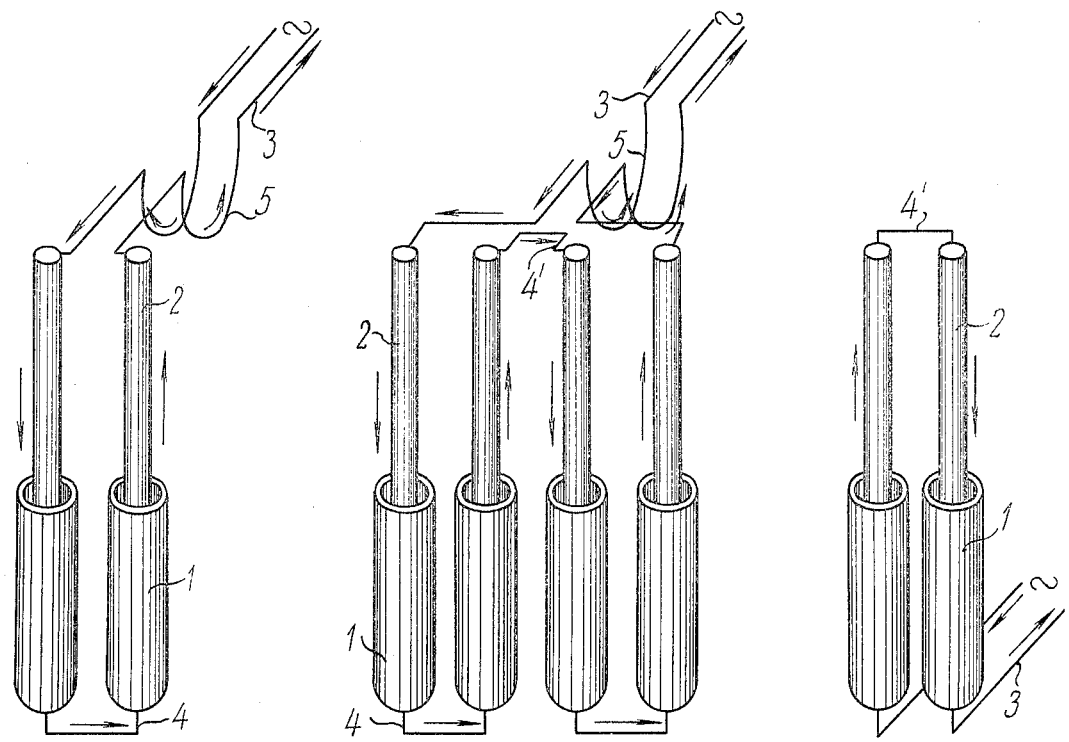

United States Patent Office 3,483,917
Patented Dec. 16, 1969

3,483,917
INSTALLATION FOR THE ELECTROSLAG REMELTING
Alexandr Alexandrovich Nikulin, Znamenskaya ul. 37, kv. 2; Vladimir Dmitrievich Artemiev, Leningradsky prospekt, 14, kv. 254; Lev Avramovich Volokhonsky, Mytnaya ul., 50-a, kv. 7; Konstantin Alexandrovich Scherbakov, Nagatinskaya ul., 63, korp. 2, kv. 164; Leonid Evgenievich Nikolsky, Galianovo, korp. 18, kv. 65; Zoya Alexandrovna Gorynina, Donskaya ul., 21, kv. 69; and Leonid Savich Katsevich, Sirenevy bulvar, 47, kv. 69, all of Moscow, U.S.S.R.
Filed Mar. 16, 1967, Ser. No. 623,612
Int. Cl. B22d 27/02
U.S. Cl. 164—250    5 Claims

ABSTRACT OF THE DISCLOSURE

Apparatus for electroslag remelting is provided with a plurality of molds each of which has an electrode immersed therein to form mold-electrode units, the units being electrically connected in series and the endmost units being connected by current leads to a voltage source.

---

The present invention relates to installations for the electroslag remelting of consumable electrodes.

To carry out the melting process, a slag bath is prepared in the mold, into which the electrode end is lowered in such a manner that heat is developed when current is being passed through the electrode and slag bath, the heat being required for melting the electrode and maintaining the slag in a liquid state. The molten metal, after flowing off the electrode in drops into the mold, is refined therein from harmful impurities, and then solidifies in the mold in the form of an ingot.

Known in the prior art are installations for electro-slag remelting, comprising a mold together with an electrode disposed therein, the electrode being connected to a voltage source by current leads. In the installations of such type, the current leads are of a considerable length, and are disposed at large distances from each other, on account of which there occur losses of electric power and a decrease in the coefficient of efficiency of the installation. These installations are adapted for the manufacturing of ingots of any shape, i.e. round or rectangular.

Attempts have been made to eliminate the above-said disadvantages by providing an installation for the electroslag remelting with two electrodes connected in series in one mold.

The adopted technical solution allows the current leads from the voltage source to be connected to the upper part of the electrodes, and enables to arrange them in the immediate proximity, i.e. according to a bifilar manner. This, in turn, enables reduction in the electrical losses in the installation and to increase its coefficient of efficiency. The installations of such a type are described in the Belgian Patent No. 670,299, 1965.

The existing installations provided with two electrodes in one mold, however, do not allow making ingots of a round shape, because in this case there would be required practical measures for the manufacturing of electrodes of semi-round shape.

All the above-described installations enable manufacture of only one ingot during the production cycle. In this connection, it is known that there have been attempts to provide an installation enabling the manufacture of three ingots during one production cycle, for which purpose the installation has been provided with three couples of the type mold-electrode, connected to a three-phase voltage source according to a star or delta connection. This permits an increase in the production capacity of the installations with a simultaneous reduction of the production floor space required.

A disadvantage of the installation provided with three molds consists in large electrical losses in the current leads, resulting from the same causes as those in a single-phase installation, and the transfer of power from one phase to another, which results in a non-uniform fusion of the electrodes in each mold. Such an installation is described in the scientific revue "Electrothermie," Zinti-electroprom, 5, 1962, p. 12.

The principal object of the invention is to provide an installation for electroslag remelting, enabling an increase in efficiency by decreasing the losses in the current leads when making an unlimited number of ingots of any cross-sectional shape.

The invention contemplates an installation for the electro-slag remelting of electrodes, each of which is disposed in a separate mold where the slag bath is to be prepared The molds and electrodes are connected by the current leads to the voltage source.

In conformity with the present invention, the couples of the type mold-electrode are connected to each other and to the voltage source in series.

It is desirable that the installation should be provided with an even number of mold-electrode couples, connected to the voltage source for carrying into effect in a more economical manner the remelting process, and to simplify the design of the installation.

To avoid the non-desirable shifting of the current leads as the electrodes are melted, it is expedient that these current leads from the voltage source be directly connected to the molds, while the electrodes are interconnected by a current-conducting partition piece.

The advantage of the invention consists first of all in the fact that when connecting two or more couples of the mold-electrode type to one voltage source there appears the possibility of reducing to the maximum extent the length of the current leads, and to approach one to the other, with different directions of current to mutually eliminate the external magnetic fields, and hence, reduce reactive losses. As a result, it is possible to increase the coefficient of efficiency and power factor of the installation.

Another advantage of the present invention lies in the fact that it is possible to effect the feed of a plurality of couples of the mold-electrode type from one voltage source, which affords the possibility of drastically reducing the production floor space to be occupied by the installation, as well as to reduce the consumption of expensive materials for the manufacturing of transformers and current leads.

Additionally, there is also required a smaller number of servicing personnel.

The advantage of the invention consists in the obtaining of ingots, having not only rectangular, but also round shape.

The nature of the present invention will further become more fully apparent from a consideration of the following description of possible exemplary embodiments thereof, taken in conjunction with the appended drawings, in which:

FIG. 1 is a schematic diagram of the installation for the electroslag remelting according to the invention, provided with two couples of the mold-electrode type, where the current leads are connected to the electrodes;

FIG. 2 shows the same installation provided with an even number of couples of the mold-electrode type, the number exceeding two, and with the connection of the current leads to the electrodes; and FIG. 3 shows the installation, provided with a partition piece between the electrodes, in which the current leads are connected to current leads.

As it is shown in FIGS. 1 to 3, the installation for the electroslag remelting comprises at least two couples of molds 1 provided with electrodes disposed therein, the electrodes being connected in series by the aid of current leads 3 to the voltage source.

One of the embodiments of the invention, represented in FIGS. 1 and 2, shows the current leads 3 connected to the electrodes 2, while the molds 1 are interconnected by means of a current-conducting partition piece 4. In the case where the number of the molds is even and exceeds two, the electrodes 2 may be also connected by a partition piece 4' (FIG. 2).

The more rational embodiment of the invention, however, is represented in FIG. 3. In this case, the current leads 3 are directly connected to the molds 1, while the electrodes 2 are interconnected by the current-conducting partition piece 4', which enables reduction in the length of the current leads 3 due to the elimination therein of a loop 5 (as it is shown in FIGS. 1 and 2), which is required for moving the electrodes 2 during their remelting.

It is preferable to have an even number of the mold-electrode types, because the length of the current leads 3 is thereby reduced to the minimum value.

The couples of the mold-electrode type in the installation can be arranged in a line or in a concentrated manner, provided that there is ensured the nearest possible arrangement of the current leads 3, the molds 1 themselves and the electrodes 2.

The automatic control of the position of the electrodes 2 in the slag bath, prepared in the molds 1, must be effected simultaneously as to the current and separately as to the voltage.

To facilitate the beginning of the melting process, it is advisable to employ the molten flux for preparing the slag bath in the molds.

The principles of operation of the installation is similar to the existing ones. The direction of current in drawings is indicated by arrows.

The production floor space, servicing personnel and the expenses remaining the same, the present invention enables to increase the production capacity of the installation by as much as several times, according to the number of the molds available, and to reduce the cost of the remelting process.

The present invention is not limited by the described embodiments thereof, and there may be allowed modifications and variants thereof that do not depart from the idea and scope of the invention.

What is claimed is:

1. Apparatus for electroslag remelting comprising a plurality of molds, an electrode immersed in each mold to form mold-electrode units, means electrically connecting said units in series, a voltage source and current leads connecting the endmost units to said source.

2. Apparatus as claimed in claim 1 wherein said units are even in number.

3. Apparatus as claimed in claim 2 wherein said current leads are connected to the molds of the endmost units, the electrodes thereof being electrically connected to the electrodes of the adjacent units.

4. Apparatus as claimed in claim 3 wherein said current leads are adjacent one another and carry current flowing in opposite directions.

5. Apparatus as claimed in claim 2 wherein said current leads are connected to the electrodes of the endmost units, the molds thereof being electrically connected to the molds of the adjacent units.

References Cited
UNITED STATES PATENTS

| | | | |
|---|---|---|---|
| 1,026,733 | 5/1912 | De Buigne | 164—52 |
| 1,070,568 | 8/1913 | Wile | 75—10 |
| 1,330,133 | 2/1920 | Northrup | 13—34 X |
| 2,781,411 | 2/1957 | Geffcken et al. | 13—6 X |
| 3,067,473 | 12/1962 | Hopkins | 75—10 X |

J. SPENCER OVERHOLSER, Primary Examiner

JOHN S. BROWN, Assistant Examiner

U.S. Cl. X.R.

75—10